United States Patent
Meng et al.

(10) Patent No.: US 11,288,050 B2
(45) Date of Patent: Mar. 29, 2022

(54) METHOD FOR ACQUIRING EXECUTABLE FILE OF HETEROGENEOUS COMPUTING SYSTEM, METHOD FOR RUNNING THE HETEROGENEOUS COMPUTING SYSTEM AND RELATED PRODUCTS

(71) Applicant: Cambricon Technologies Corporation Limited, Beijing (CN)

(72) Inventors: Xiaofu Meng, Beijing (CN); Yuanbo Wen, Beijing (CN); Zhou Fang, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 0 days.

(21) Appl. No.: 16/711,252

(22) Filed: Dec. 11, 2019

(65) Prior Publication Data

US 2020/0192649 A1    Jun. 18, 2020

(30) Foreign Application Priority Data

Dec. 14, 2018 (CN) .......................... 201811535069.9

(51) Int. Cl.
| | |
|---|---|
| *G06F 9/44* | (2018.01) |
| *G06F 8/54* | (2018.01) |
| *G06N 20/00* | (2019.01) |
| *G06F 8/41* | (2018.01) |
| *G06F 9/4401* | (2018.01) |

(52) U.S. Cl.
CPC .................. *G06F 8/54* (2013.01); *G06F 8/41* (2013.01); *G06F 9/4403* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 10,530,838 B1 * | 1/2020 | Bicka ........................ | G06F 8/41 |
| 2018/0293057 A1 * | 10/2018 | Sun .......................... | G06N 3/105 |
| 2019/0286973 A1 * | 9/2019 | Kowuri .................. | G06N 3/063 |
| 2020/0264870 A1 * | 8/2020 | Makkar .................. | G06N 5/022 |

FOREIGN PATENT DOCUMENTS

| | | |
|---|---|---|
| CN | 107239315 A | 10/2017 |
| CN | 108765257 A | 11/2018 |
| CN | 108874727 A | 11/2018 |

OTHER PUBLICATIONS 201811535069.9—Office Action, dated Sep. 4, 2019, 10 pages. (no English translation).
201811535069.9—Office Action, dated Jul. 15, 2019, 9 pages. (no English translation).

* cited by examiner

*Primary Examiner* — Insun Kang
(74) *Attorney, Agent, or Firm* — Getech Law LLC; Jun Ye (57) ABSTRACT

The invention relates to an executable file acquisition method and operation method of a heterogeneous computing system and a related product. According to the executable file obtaining method of the heterogeneous computing system, through the CPU program and the artificial intelligence processor program, the electronic device allows a user to compile a corresponding program according to needs to achieve needed functions, and the application range of a machine learning library is expanded.

9 Claims, 7 Drawing Sheets

METHOD FOR ACQUIRING EXECUTABLE FILE OF HETEROGENEOUS COMPUTING SYSTEM, METHOD FOR RUNNING THE HETEROGENEOUS COMPUTING SYSTEM AND RELATED PRODUCTS

TECHNICAL FIELD

The disclosure relates to the field of computer application technologies, and particlally relates to a method for acquiring an executable file of a heterogeneous computing system, a method for running the heterogeneous computing system, and related products.

BACKGROUND

With the development of electronic device technologies, the computing performance of CPU in electronic devices encounters bottlenecks as the quantity of data processed by electronic devices is becoming larger. Therefore, a heterogeneous computing system has appeared. The heterogeneous computing system refers to a system built with one or more general-purpose computing units (such as CPU) plus one or more dedicated computing units (such as Graphics Processing Unit, abbreviated as GPU). Heterogeneous computing refers to the general-purpose computing units and the dedicated computing units working together to perform general computing tasks, so as to accelerate processing capacity of the data.

Artificial intelligence processing units (such as Machine Learning Unit, abbreviated as MLU) can be combined with CPU to build a heterogeneous computing system for processing artificial intelligence processing unit programs written in neural network programming languages, so as to accelerate processing speed of various machine learning or deep learning algorithms. In conventional technologies, an electronic device is generally used to call preset operators that support required functions in a machine learning library, or a plurality of preset operators that support different functions in a machine learning library are spliced to achieve required functions.

However, since the above method of calling a single operator or a spliced operator in the machine learning library cannot fully implement new functions required by users, the application scope of the method may be narrow.

SUMMARY

In view of this, it is necessary to provide a method for acquiring an executable file of a heterogeneous computing system, a method for running the heterogeneous computing system, and related products to solve the above problem of the conventional technologies.

In a first aspect, examples of the present disclosure provide a method for acquiring an executable file of a heterogeneous computing system, where the heterogeneous computing system includes a general-purpose processing unit CPU and an artificial intelligence processing unit, and the method includes:

acquiring an artificial intelligence processing unit program and a CPU program, where the artificial intelligence processing unit program includes an entry function, and the CPU program includes an identifier of the entry function and an interface function set;

compiling the artificial intelligence processing unit program to generate a first compiling file, and linking the first compiling file to a link library of a machine learning library; and compiling the CPU program to acquire a second compiling file, and linking the second compiling file to the link library to generate an executable file of the heterogeneous computing system.

In the method for acquiring an executable file of a heterogeneous computing system provided in the example, an electronic device may acquire an artificial intelligence processing unit program and a CPU program, where the artificial intelligence processing unit program includes an entry function, and the CPU program includes an identifier of the entry function and an interface function set; may compile the artificial intelligence processing unit program to generate a first compiling file, and link the first compiling file to a link library of a machine learning library; and compile the CPU program to acquire a second compiling file, and link the second compiling file to the link library to generate an executable file of the heterogeneous computing system. In this example, the electronic device allows users to write artificial intelligence processing unit programs corresponding to operators that can implement required functions. The electronic device can also receive data required by the artificial intelligence processing unit program input by users by using an interface function set composed of multiple interface functions in the machine learning library. In this way, when executing the executable file, CPU in the electronic device can call a target artificial intelligence processing unit to execute the artificial intelligence processing unit program. Therefore, corresponding functions of the artificial intelligence processing unit may be implemented. In other words, the electronic device allows users to customize new operators according to required functions by using interface functions in the machine learning library, which may solve the problem in the prior art that the method of calling a single operator or a spliced operator in the machine learning library cannot fully implement new functions required by users, and expand the application scope of machine learning library.

In an example, the interface function set is configured to acquire a parameter required for running the artificial intelligence processing unit program.

In an example, the interface function set configured to acquire a parameter required for running the artificial intelligence processing unit program includes:

an initialization declaration interface function in the interface function set configured to declare a struct variable;

an input address interface function in the interface function set configured to acquire an input address in the struct variable;

an output address interface function in the interface function set configured to acquire an output address in the struct variable;

a static address interface function in the interface function set configured to acquire a static address in the struct variable; and a constant parameter interface function in the interface function set configured to acquire a constant parameter in the struct variable.

In an example, the interface function set is further configured to acquire an identifier of the artificial intelligence processing unit program, where the identifier of the artificial intelligence processing unit program is acquired according to a parameter in the struct variable acquired by the interface function set, a number and a descriptor of the parameter in the struct variable, and the identifier of the entry function of the artificial intelligence processing unit program.

In an example, the interface function set is further configured to acquire an identifier of an artificial intelligence processing unit, so as to make the artificial intelligence processing unit corresponding to the identifier of the artificial intelligence processing unit execute the artificial intelligence processing unit program.

In an example, the compiling the artificial intelligence processing unit program to generate a first compiling file, and linking the first compiling file to a link library of a machine learning library includes:

acquiring a preset artificial intelligence compiler and a linker;

compiling the artificial intelligence processing unit program according to the artificial intelligence compiler to generate the first compiling file; and linking, by the linker, the compiling file to the link library.

In an example, the compiling the CPU program to acquire a second compiling file, and linking the second compiling file to the link library to generate an executable file of the heterogeneous computing system includes:

acquiring a preset CPU compiler;

compiling the CPU program according to the CPU compiler to acquire the second compiling file; and linking, by the linker, the second compiling file to the link library to generate an executable file of the heterogeneous computing system.

In a second aspect, examples of the present disclosure provides a method for running a heterogeneous computing system, where the method includes:

acquiring an executable file described in any of the above examples;

running an initialization declaration interface function, an input address interface function, an output address interface function, a static address interface function, and a constant parameter interface function in the executable file, and outputting a parameter required for running an artificial intelligence processing unit program in the executable file;

running an interface function for acquiring an identifier of the artificial intelligence processing unit program in the executable file according to a parameter in the struct variable acquired by the interface function set, the number and the descriptor of the parameter in the struct variable, and an identifier of an entry function of the artificial intelligence processing unit program, and outputting an identifier of the artificial intelligence processing unit program; and transferring the identifier of the artificial intelligence processing unit program to the interface function configured to acquire the identifier of the artificial intelligence processing unit program in the executable file, and transferring the artificial intelligence processing unit program to a target artificial intelligence processing unit corresponding to the identifier of the artificial intelligence processing unit according to the identifier of the artificial intelligence processing unit in the interface function for acquiring the identifier of the artificial intelligence processing unit, so as to make the target artificial intelligence processing unit execute the artificial intelligence processing unit program.

In the method for running a heterogeneous computing system provided in the example, an electronic device may acquire an executable file described in any of the above examples; run an initialization declaration interface function, an input address interface function, an output address interface function, a static address interface function, and a constant parameter interface function in the executable file, and output a parameter required for running the artificial intelligence processing unit program in the executable file; run an interface function configured to acquire an identifier of the artificial intelligence processing unit program in the executable file according to a parameter in the struct variable acquired by the interface function set, a number and a descriptor of the parameter in the struct variable, and an identifier of an entry function of the artificial intelligence processing unit program, and output the identifier of the artificial intelligence processing unit program; and transfer the identifier of the artificial intelligence processing unit program to the interface function configured to acquire an identifier of the artificial intelligence processing unit program in the executable file, and transfer the artificial intelligence processing unit program to a target artificial intelligence processing unit corresponding to the identifier of the artificial intelligence processing unit according to the identifier of the artificial intelligence processing unit in the interface function configured to acquire the identifier of the artificial intelligence processing unit, so as to make the target artificial intelligence processing unit execute the artificial intelligence processing unit program. In the example, the electronic device can call a target artificial intelligence processing unit corresponding to the identifier of the artificial intelligence processing unit program to execute the artificial intelligence processing unit program corresponding to the identifier of the artificial intelligence processing unit program when executing an executable file according to data required by the artificial intelligence processing unit program in the interface function set composed of multiple interface functions in the executable file. The data includes a name of the entry function, an input address, the identifier of the artificial intelligence processing unit program, and the identifier of the artificial intelligence processing unit, and the like. Therefore, corresponding functions of the artificial intelligence processing unit written by users may be implemented. In this way, the electronic device allows users to customize new operators according to required functions by using interface functions in the machine learning library, which may solve the problem in the prior art that the method of calling a single operator or a spliced operator in the machine learning library cannot fully implement new functions required by users, and expand the application scope of machine learning library.

In a third aspect, examples of the present disclosure provide a device for acquiring an executable file of a heterogeneous computing system, where the heterogeneous computing system includes a general-purpose processing unit CPU and an artificial intelligence processing unit, and the device includes:

a first acquiring module configured to acquire an artificial intelligence processing unit program and a CPU program, where the artificial intelligence processing unit program includes an entry function, and the CPU program includes an identifier of the entry function and an interface function set;

a first generating module configured to compile the artificial intelligence processing unit program to generate a first compiling file, and link the first compiling file to a link library of a machine learning library; and a second generating module configured to compile the CPU program to acquire a second compiling file, and link the second compiling file to the link library to generate an executable file of the heterogeneous computing system.

In an example, the interface function set is configured to acquire a parameter required for running the artificial intelligence processing unit program.

In an example, the interface function set configured to acquire a parameter required for running the artificial intelligence processing unit program includes:

an initialization declaration interface function in the interface function set configured to declare a struct variable;

an input address interface function in the interface function set configured to acquire an input address in the struct variable;

an output address interface function in the interface function set configured to acquire an output address in the struct variable;

a static address interface function in the interface function set configured to acquire a static address in the struct variable; and a constant parameter interface function in the interface function set configured to acquire a constant parameter in the struct variable.

In an example, the interface function set is further configured to acquire an identifier of the artificial intelligence processing unit program, where the identifier of the artificial intelligence processing unit program is acquired according to a parameter in the struct variable acquired by the interface function set, a number and a descriptor of the parameter in the struct variable, and the identifier of the entry function of the artificial intelligence processing unit program.

In an example, the interface function set is further configured to acquire an identifier of an artificial intelligence processing unit, so as to make the artificial intelligence processing unit corresponding to the identifier of the artificial intelligence processing unit execute the artificial intelligence processing unit program.

In an example, the first generating module includes:

a first acquiring unit configured to acquire a preset artificial intelligence compiler and a linker;

a first generating unit configured to compile the artificial intelligence processing unit program according to the artificial intelligence compiler to generate a first compiling file; and a first linking unit configured to link the compiling file to the link library by using the linker.

In an example, the second generating module includes:

a second acquiring unit configured to acquire a preset CPU compiler;

a second generating unit configured to compile the CPU program according to the CPU compiler to acquire a second compiling file; and a second linking unit configured to link the second compiling file to the link library to generate an executable file of the heterogeneous computing system.

In a fourth aspect, examples of the present disclosure provide a device for running a heterogeneous computing system, where the device includes:

a second acquiring module configured to acquire an executable file described in any of the above examples;

a first processing module configured to run an initialization declaration interface function, an input address interface function, an output address interface function, a static address interface function, and a constant parameter interface function in the executable file, and output a parameter required for running the artificial intelligence processing unit program in the executable file;

a second processing module configured to run an interface function for acquiring an identifier of the artificial intelligence processing unit program in the executable file according to a parameter in the struct variable acquired by the interface function set, a number and a descriptor of the parameter in the struct variable, and an identifier of an entry function of the artificial intelligence processing unit program, and output an identifier of the artificial intelligence processing unit program; and a third processing module configured to transfer the identifier of the artificial intelligence processing unit program to the interface function configured to acquire an identifier of the artificial intelligence processing unit program in the executable file, and transfer the artificial intelligence processing unit program to a target artificial intelligence processing unit corresponding to the identifier of the artificial intelligence processing unit according to the identifier of the artificial intelligence processing unit in the interface function for acquiring the identifier of the artificial intelligence processing unit, so as to make the target artificial intelligence processing unit execute the artificial intelligence processing unit program.

In a fifth aspect, examples of the present disclosure provide a CPU, where the CPU and an artificial intelligence processing unit constitute a heterogeneous computing system, and the CPU is configured to implement following steps:

acquiring an artificial intelligence processing unit program and a CPU program, where the artificial intelligence processing unit program includes an entry function, and the CPU program includes an identifier of the entry function and an interface function set;

compiling the artificial intelligence processing unit program to generate a first compiling file, and linking the first compiling file to a link library of a machine learning library; and compiling the CPU program to acquire a second compiling file, and linking the second compiling file to the link library to generate an executable file of the heterogeneous computing system.

The CPU is further configured to implement the following steps:

acquiring the executable file described in any of the above examples;

running an initialization declaration interface function, an input address interface function, an output address interface function, a static address interface function, and a constant parameter interface function in the executable file, and outputting a parameter required for running the artificial intelligence processing unit program in the executable file;

running an interface function for acquiring an identifier of the artificial intelligence processing unit program in the executable file according to a parameter in a struct variable acquired by the interface function set, a number and a descriptor of the parameter in the struct variable, and an identifier of an entry function of the artificial intelligence processing unit program, and outputting an identifier of the artificial intelligence processing unit program; and transferring the identifier of the artificial intelligence processing unit program to the interface function configured to acquire an identifier of the artificial intelligence processing unit program in the executable file, and transferring the artificial intelligence processing unit program to a target artificial intelligence processing unit corresponding to the identifier of the artificial intelligence processing unit according to the identifier of the artificial intelligence processing unit in the interface function for acquiring the identifier of the artificial intelligence processing unit, so as to make the target artificial intelligence processing unit execute the artificial intelligence processing unit program.

In a sixth aspect, examples of the present disclosure provide a motherboard applied to a heterogeneous computing system, where the motherboard includes: the CPU described in the above examples, a first memory connected to the CPU, an artificial intelligence processing unit, and a second memory connected to the artificial intelligence processing unit; where the first memory is configured to store a CPU program and an artificial intelligence processing unit program, the second memory is configured to store input data and output data required by the artificial intelligence processing unit, and the artificial intelligence processing unit is configured to execute the artificial intelligence processing unit program.

In a seventh aspect, examples of the present disclosure provides an electronic device applied to a heterogeneous computing system, where the electronic device includes the motherboard described in the above example, and CPU in the motherboard is configured to implement the following steps:

acquiring an artificial intelligence processing unit program and a CPU program, where the artificial intelligence processing unit program includes an entry function, and the CPU program includes an identifier of the entry function and an interface function set;

compiling the artificial intelligence processing unit program to generate a first compiling file, and linking the first compiling file to a link library of a machine learning library; and compiling the CPU program to acquire a second compiling file, and linking the second compiling file to the link library to generate an executable file of the heterogeneous computing system.

The CPU is further configured to implement the following steps:

acquiring the executable file described in any of the above examples;

running an initialization declaration interface function, an input address interface function, an output address interface function, a static address interface function, and a constant parameter interface function in the executable file, and outputting a parameter required for running the artificial intelligence processing unit program in the executable file;

running an interface function for acquiring an identifier of the artificial intelligence processing unit program in the executable file according to a parameter in a struct variable acquired by the interface function set, a number and a descriptor of the parameter in the struct variable, and an identifier of an entry function of the artificial intelligence processing unit program, and outputting an identifier of the artificial intelligence processing unit program; and transferring the identifier of the artificial intelligence processing unit program to the interface function configured to acquire an identifier of the artificial intelligence processing unit program in the executable file, and transferring the artificial intelligence processing unit program to a target artificial intelligence processing unit corresponding to the identifier of the artificial intelligence processing unit according to the identifier of the artificial intelligence processing unit in the interface function for acquiring the identifier of the artificial intelligence processing unit, so as to make the target artificial intelligence processing unit execute the artificial intelligence processing unit program.

In the executable file acquiring device of the heterogeneous computing system, the device for running the heterogeneous computing system, CPU, the motherboard, and the electronic device provided in the examples, the electronic device is configured to acquire an artificial intelligence processing unit program and a CPU program, where the artificial intelligence processing unit program includes an entry function, and the CPU program includes an identifier of the entry function and an interface function set; compile the artificial intelligence processing unit program to generate a first compiling file, and link the first compiling file to a link library of a machine learning library; and compile the CPU program to acquire a second compiling file, and link the second compiling file to the link library to generate an executable file of the heterogeneous computing system. In this example, the electronic device allows users to write artificial intelligence processing unit programs corresponding to operators that can implement required functions, and receives data required by the artificial intelligence processing unit program input by users by using an interface function set composed of multiple interface functions in the machine learning library, so that CPU in the electronic device can call a target artificial intelligence processing unit to execute the artificial intelligence processing unit program to execute the artificial intelligence processing unit program when executing the executable file. Therefore, corresponding functions of the artificial intelligence processing unit may be implemented, that is, the electronic device allows users to customize new operators according to required functions by using interface functions in the machine learning library, which may solve the problem in the prior art that the method of calling a single operator or a spliced operator in the machine learning library cannot fully implement new functions required by users, and expand the application scope of machine learning library.

DETAILED DESCRIPTION OF EXAMPLES

In order to describe purposes, technical solutions, and technical effects of the present disclosure more clearly, the present disclosure will be described clearly and completely hereinafter with reference to the accompanied drawings and examples. It should be understood that the terms used in the specification of the present disclosure are merely intended to describe specific examples rather than to limit the present disclosure.

Figure 1:
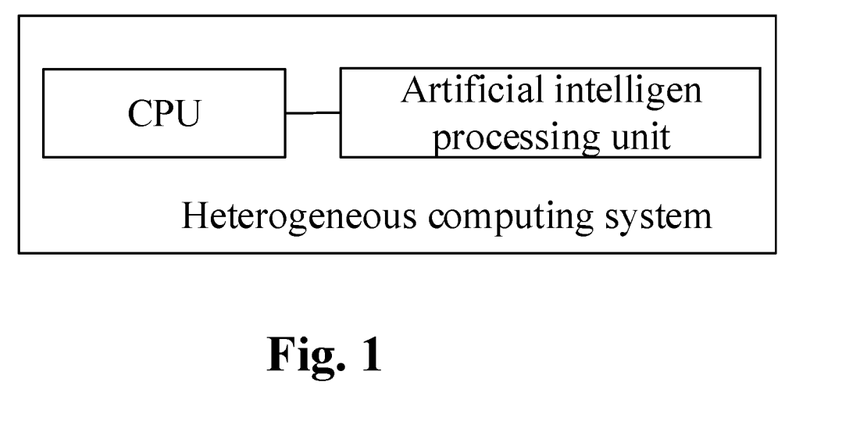
FIG. 1 is a schematic structural diagram of a heterogeneous computing system according to an example.

A method for acquiring an executable file of a heterogeneous computing system provided in the examples can be applied to a heterogeneous computing system shown in FIG. 1, where the system may include CPU and at least one artificial intelligence processing unit such as an artificial intelligence processing unit-1, an artificial intelligence processing unit-2 . . . , an artificial intelligence processing unit-n, etc. The CPU can make one of the artificial intelligence processing units execute a specified artificial intelligence processing unit program through certain instructions, so as to make the CPU and the artificial intelligence processing unit perform parallel computing, that is, the CPU can execute a CPU program, and the artificial intelligence processing unit can execute the artificial intelligence processing unit program, so that the CPU and the artificial intelligence processing unit can perform heterogeneous computations in parallel. Optionally, the artificial intelligence processing unit may be a machine learning processing unit MLU or a neural network processing unit. The type of the artificial intelligence processing unit is not limited in the examples of the present disclosure.

In the prior art, an electronic device is generally used to call preset operators that support required functions in a machine learning library, or a plurality of preset operators that support different functions in a machine learning library are spliced to achieve required functions. However, since sometimes the above method of calling a single operator or a spliced operator in the machine learning library cannot fully implement new functions required by users, the application scope of the conventional technologies may be narrow. Examples of the preset disclosure aim to solve the above problems in the prior art It should be noted that the method of acquiring an executable file of a heterogeneous computing system and the method for running a heterogeneous computing system provided in examples of the present disclosure may be executed by CPU, a motherboard of an artificial intelligence processing unit, or an electronic device which contains the motherboard. In all the following examples of the methods, the electronic device is used for description.

Figure 2:
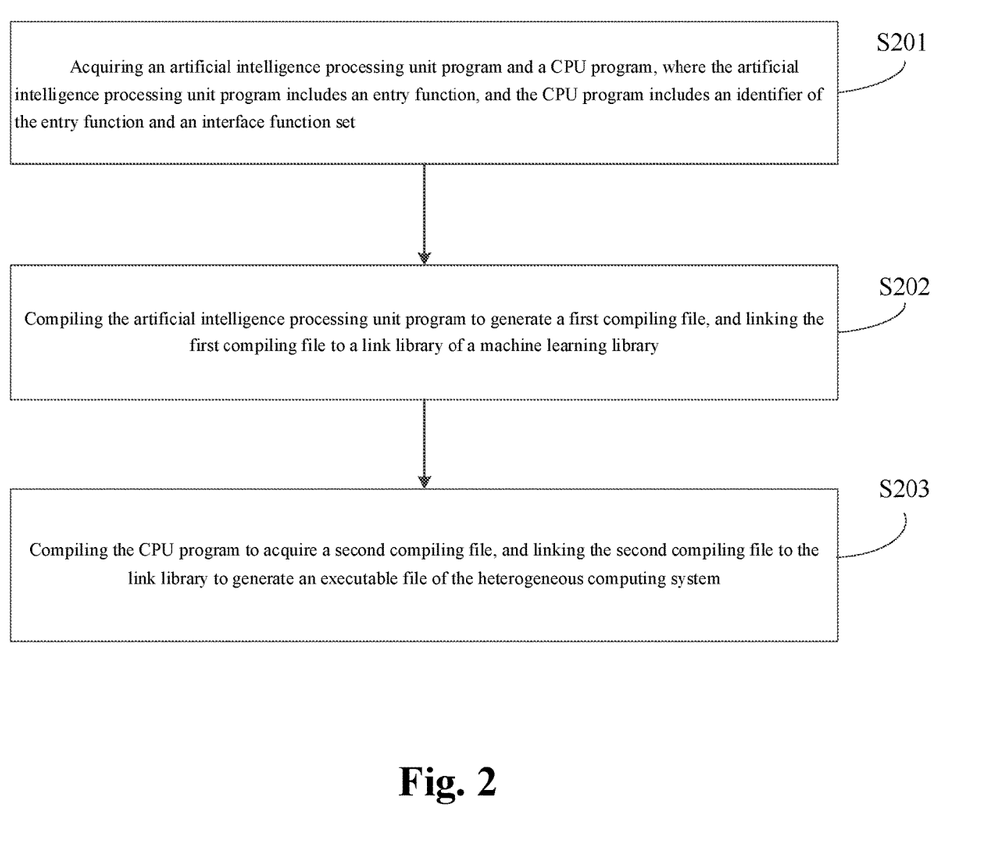
FIG. 2 is a schematic flowchart of a method for acquiring an executable file of a heterogeneous computing system according to an example.

FIG. 2 is a schematic flowchart of a method for acquiring an executable file of a heterogeneous computing system according to an example. The example relates to an implementation process in which an electronic device compiles and links an acquired CPU program and an artificial intelligence processing unit program to generate an executable file. As shown in FIG. 2, the method may include:

a step S201, acquiring an artificial intelligence processing unit program and a CPU program, where the artificial intelligence processing unit program includes an entry function, and the CPU program includes an identifier of the entry function and an interface function set.

Specifically, an electronic device may acquire a required CPU program from a first memory connected to the CPU. Optionally, the CPU program may be a program written in a high-level language such as the C language, the JAVA language, or the C++ language. Optionally, the artificial intelligence processing unit program may be a program written in a neural network programming language. Furthermore, the neural network programming language is a language for writing an artificial intelligence processing unit program. An identifier of the artificial intelligence processing unit is an identifier of an artificial intelligence processing unit corresponding to a target artificial intelligence processing unit executing the artificial intelligence processing unit program. Optionally, the CPU program and the artificial intelligence processing unit program may be integrated in a same program or two independent programs. Optionally, the CPU program and the artificial intelligence processing unit program may call each other by using preset instructions. Optionally, CPU in the electronic device can input and output required data by using each interface function in the interface function set. For instance, one of the interface functions can be configured to input an address of a required variable and output an output variable whose value is an address of the required variable.

The CPU program may be a program written by users as required to call the interface function set for calling the artificial intelligence processing unit program. The electronic device may allow users to input an identifier of an artificial intelligence processing unit program, an identifier of an artificial intelligence processing unit, and the like, according to each interface function in the interface function set of the CPU program. Furthermore, the identifier of the artificial intelligence processing unit program may be a variable, and the electronic device may further allow users to input data related to the identifier of the artificial intelligence processing unit program according to each interface function in the interface function set of the CPU program, such as a program entry required for running the artificial intelligence processing unit program corresponding to the identity of the artificial intelligence processing unit program. The artificial intelligence processing unit program may be a program written by users according to required functions, and the function may be a new function that the users cannot implement by calling a single operator or a spliced operator in the machine learning library through the electronic device.

Optionally, the interface function set may be a preset interface function in the machine learning library, and users may splice operators corresponding to one interface function or corresponding to multiple interface functions in the machine learning library by using the electronic device to achieve required functions.

Furthermore, the entry function is a main function of an artificial intelligence processing unit program. Optionally, the artificial intelligence processing unit program may include a main program corresponding to the entry function and other programs other than the main program. Furthermore, the program corresponding to the entry function and other programs correspond to different program bodies respectively, therefore, the artificial intelligence processing unit program may include a program body of a program corresponding to the entry function and program bodies of other programs. Optionally, when a target artificial intelligence processing unit corresponding to the an identifier of the artificial intelligence processing unit executes the artificial intelligence processing unit program according to an instruction with the identifier of the artificial intelligence processing unit program transferred by the CPU, the target artificial intelligence processing unit executes the artificial intelligence processing unit program corresponding to the identifier of the artificial intelligence processing unit program from the entry function.

The method may further include:

a step S202, compiling the artificial intelligence processing unit program to generate a first compiling file, and linking the first compiling file to a link library of the machine learning library.

Specifically, the first compiling file may be a compiled non-executable binary file, and the link library may be a link library of a specified machine learning library. The machine learning library may include interface functions that support different operators, which may allow users to achieve required functions by calling one of the operators or splicing multiple operators. Furthermore, the machine learning library includes the interface function set used in the examples of the present disclosure. CPU may send data required by the artificial intelligence processing unit to the artificial intelligence processing unit by using an interface function in the machine learning library, so that the artificial intelligence processing unit can execute an artificial intelligence processing unit program specified by CPU. The electronic device may compile the artificial intelligence processing unit program by using a preset first compiling program, a preset first linking program, and/or a preset first instruction to generate a first compiling file, and link the first compiling file to an initial link library of the machine learning library. Optionally, the electronic device may generate the first compiling file linked to the link library of the machine learning library through the following steps:

a step S2021, acquiring a preset artificial intelligence compiler and a preset linker, where the artificial intelligence compiler and the preset linker may respectively represent a program that can implement a compiling function and a program that can implement a linking function, such as a program written in the C language or a program written in C++;

a step S2022, compiling the artificial intelligence processing unit program according to the artificial intelligence compiler to generate a first compiling file, where the electronic device may compile the artificial intelligence processing unit program by using the artificial intelligence compiler, and convert the artificial intelligence processing unit program into a binary first compiling file that can be recognized by the electronic device; and a step S2023, linking the compiling file to the link library by using the linker, where the electronic device may link the first compiling file to the link library by using the preset linker.

Through the steps S2021 to S2023, the electronic device may link the first compiling file to the link library, so as to facilitate the electronic device to link the CPU program to the link library linked to the first compiling file according to the step S203. Therefore, CPU may call the artificial intelligence processing unit corresponding to the identifier of the artificial intelligence processing unit to execute the artificial intelligence processing unit program when executing the executable file.

The method may further include:

in step S203, compiling the CPU program to acquire a second compiling file, and linking the second compiling file to the link library to generate the executable file of the heterogeneous computing system.

Specifically, the second compiling file may be a compiled non-executable binary file. Optionally, the electronic device may compile and link the CPU program by using a preset second compiler, a preset second link program, and/or a preset second instruction to generate a second compiling file, and link the second compiling file to the link library to generate an executable file of the heterogeneous computing system. It should be noted that when the second compiling file is linked to the link library to generate the executable file of the heterogeneous computing system, the link library has been linked to the first compiling file. Optionally, the executable file includes data required by a target artificial intelligence processing unit corresponding to an identifier of the artificial intelligence processing unit to run the artificial intelligence processing unit program. Optionally, the first link program and the second link program are the same program. Optionally, the electronic device may generate the executable file through the following steps:

in step S2031, acquiring a preset CPU compiler, where the CPU compiler may be a compiling program capable of compiling a CPU program;

in step S2032, compiling the CPU program according to the CPU compiler to acquire a second compiling file, where the electronic device may compile the CPU program by using the CPU compiler, and compile the CPU program into a binary second compiling file; and in step S2033, linking, by the linker, the second compiling file to the link library to generate an executable file of the heterogeneous computing system, where the electronic device may link the second compiling file and the link library by using the linker to convert the CPU program into an executable file executable by the heterogeneous computing system.

Through the steps S2031 to S2033, the electronic device can compile a link to the CPU program to generate an executable file executable by the above heterogeneous computing system.

In the method for acquiring an executable file of a heterogeneous computing system provided in the example, an electronic device may acquire an artificial intelligence processing unit program and a CPU program, where the artificial intelligence processing unit program includes an entry function, and the CPU program includes an identifier of the entry function and an interface function set; compile the artificial intelligence processing unit program to generate a first compiling file, and link the first compiling file to a link library of a machine learning library; and compile the CPU program to acquire a second compiling file, and link the second compiling file to the link library to generate an executable file of the heterogeneous computing system. In this example, the electronic device allows users to write artificial intelligence processing unit programs corresponding to operators that can implement required functions. The electronic device can also receive data required by the artificial intelligence processing unit program input by users by using an interface function set composed of multiple interface functions in the machine learning library, so that when executing the executable file, CPU in the electronic device can call a target artificial intelligence processing unit to execute the artificial intelligence processing unit program. Therefore, corresponding functions of the artificial intelligence processing unit may be implemented. In other words, the electronic device allows users to customize new operators according to required functions by using interface functions in the machine learning library, which may solve the problem in the prior art that the method of calling a single operator or a spliced operator in the machine learning library cannot fully implement new functions required by users, and expand the application scope of machine learning library.

In an example, based on the above examples, the interface function set is configured to acquire a parameter required for running the artificial intelligence processing unit program, where the parameter is a parameter required by the electronic device for running the artificial intelligence processing unit program output through the interface function set.

Optionally, an initialization declaration interface function in the interface function set is configured to declare a struct variable, where the initialization declaration interface function may be an interface function configured to declare the struct variable required for running the artificial intelligence processing unit program.

Optionally, an input address interface function in the interface function set is configured to acquire an input address in the struct variable, where the input address interface function may be an interface function configured to take the input address of an input variable in the struct variable as an input, and users may input the address of an output variable by using the input address interface function.

Optionally, an output address interface function in the interface function set is configured to acquire an output address in the struct variable, where the output address interface function may be an interface function configured to take the output address of an output variable in the struct variable as input, and users may input the address of the output variable by using the output address interface function.

Optionally, a static address interface function in the interface function set is configured to acquire a static address in the struct variable, where the static address interface function may be an interface function configured to take an address of a static variable in the struct variable as an input, and users may input the static address of the static variable by using the static address interface function. Optionally, the static address may be content stored in a corresponding storage space as required. In an example, the static address may be configured to store weights in a neural network convolution operation.

Optionally, a constant parameter interface function in the interface function set is configured to acquire a constant parameter in the struct variable, where the constant parameter interface function may be an interface function configured to take the constant parameter in the struct variable as an input, and users may input the constant parameter by using the constant parameter interface function.

It should be noted that examples of the present disclosure do not limit specific functions corresponding to the initialization declaration interface function, as long as declaration of the struct variable can be implemented. The initialization declaration interface functions in different machine learning libraries may be different. Similarly, specific functions corresponding to the interface function such as the input address interface function, the output address interface function, the static address interface function, and the constant parameter interface function are not limited hereto.

Furthermore, the parameter may include an input address, an output address, a static address, and a constant parameter. Optionally, the initialization declaration interface function is configured to declare a struct variable required for running the artificial intelligence processing unit program. Optionally, the initialization declaration interface function may only be configured to declare the struct variable, and not require users to input any data to the interface, that is, the data input to the interface is null. Optionally, the input address interface function may be configured to receive the input address of the input variable input by users. Similarly, the output address interface function may be configured to receive the output address of the output variable input by users, and the static address interface function may be configured to receive the static address of the static variable input by users, and the constant parameter interface function may be configured to receive the constant parameter for inputting. It should be noted that there may be one or more of the input variable, the output variable, the static variable, the constant parameter, and the corresponding address or constant parameter may be one or more. For instance, there are three input variables and each input variable corresponds to one address, then three input variables correspond to three addresses. Optionally, one or more of the input variable, the output variable, the static variable, and the constant parameter may also be null, which means not inputting data into one or more interface functions of the initialization declaration interface function, the input address interface function, the output address interface function, the static address interface function, and constant parameter interface function.

In the method for acquiring an executable file of the heterogeneous computing system provided in this example, an electronic device may acquire parameters such as an input address, an output address, a static address, and a constant parameter input by users by using an initialization declaration interface function, an input address interface function, an output address interface function, a static address interface function, a constant parameter interface function, and the like in the interface function set to provide parameters required for running the artificial intelligence processing unit program for a target artificial intelligence processing unit that needs to process the artificial intelligence processing unit program. In this way, it can be ensured that the target artificial intelligence processing unit can run the artificial intelligence processing unit program normally.

In an example, based on the above examples, the interface function set is further configured to acquire an identifier of an artificial intelligence processing unit program, where the identifier of the artificial intelligence processing unit program may be acquired according to a parameter in the struct variable acquired by the interface function set, a number and a descriptor of the parameter in the struct variable, and the identifier of the entry function of the artificial intelligence processing unit program.

In an example, the number of parameters in the struct variable may include the number of input variables, output variables, static variables, and constant parameters. The input variable, the output variable, the static variable, the constant parameter, and the like may be represented by a tensor. The descriptor of the struct variable, which is also a descriptor of the tensor, may be a data type (such as integer, floating point, etc.), an order (such as the number of dimensions of an array for the tensor), and a shape (such as length in each dimension) of each variable in the struct variable. Optionally, the electronic device may receive, by using an operator creation interface function in the interface function set, a parameter in the struct variable input by users, the number and the descriptor of the parameter in the struct variable, and the identifier of the entry function of the artificial intelligence processing unit program. Optionally, the name of the entry function identifier needs to be the same as the name of the entry function. Optionally, the operator creation interface function in the interface function set is further configured to output the identifier of the artificial intelligence processing unit program.

In the method for acquiring the executable file of the heterogeneous computing system provided in the example, an interface function set may acquire an identifier of the artificial intelligence processing unit program, where the identifier of the artificial intelligence processing unit program may be acquired according to a parameter in the struct variable acquired by the interface function set, the number and the descriptor of the parameter in the struct variable, and the identifier of the entry function of the artificial intelligence processing unit program. In an example, the electronic device may acquire the identifier of the artificial intelligence processing unit program by using the interface function set, so that the target artificial intelligence processing unit corresponding to the identifier of the artificial intelligence processing unit may find out the artificial intelligence processing unit program required for execution and data such as parameters required for executing the artificial intelligence processing unit program according to the identifier of the artificial intelligence processing unit program. In this way, it can be ensured that the target artificial intelligence processing unit can run the artificial intelligence processing unit program normally.

In an example, based on the above examples, the interface function set is further configured to acquire an identifier of the artificial intelligence processing unit, so as to make the artificial intelligence processing unit corresponding to the identifier of the artificial intelligence processing unit execute the artificial intelligence processing unit program.

In an example, the electronic device may acquire the identifier of the artificial intelligence processing unit program input by users and the identifier of the artificial intelligence processing unit by calling an interface function of the artificial intelligence processing unit program in the interface function set, so that the artificial intelligence processing unit corresponding to the identifier of the artificial intelligence processing unit can execute the artificial intelligence processing unit program. Therefore, the target artificial intelligence processing unit corresponding to the identifier of the artificial intelligence processing unit can be used to implement functions required by users by using the artificial intelligence processing unit program.

Figure 3:
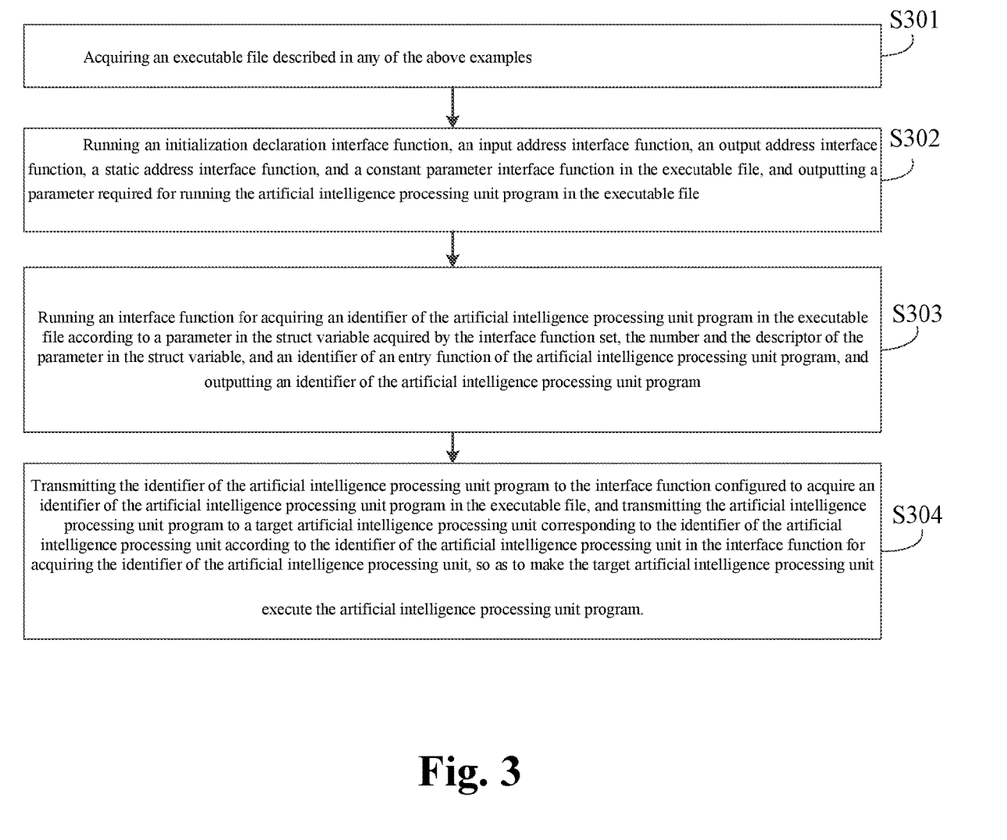
FIG. 3 is a schematic flowchart of a method for running a heterogeneous computing system according to an example.

FIG. 3 is a schematic diagram of a method for running a heterogeneous computing system according to an example. The example relates to an implementation process in which an electronic device runs the executable file to make an artificial intelligence processing unit corresponding to an identifier of the artificial intelligence processing unit execute a corresponding artificial intelligence processing unit program. As shown in FIG. 3, the method may include:

in step S301, acquiring the executable file provided in any of the above examples; and in step S302, running an initialization declaration interface function, an input address interface function, an output address interface function, a static address interface function, and a constant parameter interface function in the executable file, and outputting a parameter required for running the artificial intelligence processing unit program in the executable file.

Specifically, when the electronic device runs the initialization declaration interface function in the executable file, a struct variable may be declared according to the initialization declaration interface function, where the struct variable at the moment is null. When running the initialization declaration interface function, the electronic device may assign an input address to the declared struct variable according to an input address of an input variable input to the input address interface function; similarly, when running the output address interface function in the interface function, the electronic device may assign an output address to the declared struct variable according to an output address of an output variable input to the output address interface function; when running the static address interface function, the electronic device may assign a static address to the declared struct variable according to a static address input to the static address interface function, and when running the constant parameter interface function, the electronic device may assign a constant parameter to the declared struct variable according to a constant parameter input to the constant parameter interface function. At the moment, a value assigned to the struct variable includes the input address, the output address, the static address, and the constant parameter, that is, the struct variable at the moment is the parameter required for running the artificial intelligence processing unit program.

The method may further include:

in step S303, running an interface function for acquiring an identifier of the artificial intelligence processing unit program in the executable file according to a parameter in the struct variable acquired by the interface function set, the number and the descriptor of the parameter in the struct variable, and an identifier of an entry function of the artificial intelligence processing unit program, and outputting an identifier of the artificial intelligence processing unit program.

Specifically, when the electronic device runs the interface function for acquiring the identifier of the artificial intelligence processing unit program in the executable file, the identifier of the artificial intelligence processing unit program may be output according to the parameter input to the interface function for acquiring the identifier of the artificial intelligence processing unit program in the step S302, the number and the descriptor of the parameter in the struct variable, and the name of the entry function of the artificial intelligence processing unit program. For instance, the identifier of the artificial intelligence processing unit program may be OP, then according to OP, the artificial intelligence processing unit for executing the artificial intelligence processing unit program may find out the entry function required for execution, a specific value of a required parameter (such as an input address and an output address, etc.), the number and the descriptor of the parameter in the struct variable, and the like.

The method may further include:

in step S304, transferring the identifier of the artificial intelligence processing unit program to the interface function configured to acquire an identifier of the artificial intelligence processing unit program in the executable file, and transferring the artificial intelligence processing unit program to a target artificial intelligence processing unit corresponding to the identifier of the artificial intelligence processing unit according to the identifier of the artificial intelligence processing unit in the interface function for acquiring the identifier of the artificial intelligence processing unit, so as to make the target artificial intelligence processing unit execute the artificial intelligence processing unit program.

Specifically, after executing the step S303, the electronic device may send the identifier of the artificial intelligence processing unit program outputted in the step S303, such as OP, to the interface function for acquiring the identifier of the artificial intelligence processing unit, and determine the identifier of the artificial intelligence processing unit required for executing the artificial intelligence processing unit program according to the identifier of the artificial intelligence processing unit in the interface function for acquiring the identifier of the artificial intelligence processing unit. Then the electronic device may transfer the artificial intelligence processing unit program to a target artificial intelligence processing unit corresponding to the identifier of the artificial intelligence processing unit, so as to make the target artificial intelligence processing unit execute the artificial intelligence processing unit program to finally implement corresponding functions of the artificial intelligence processing unit program. Optionally, the electronic device may further receive a flag returned by the target artificial intelligence processing unit after executing the artificial intelligence processing unit program. The flag indicates whether the execution succeeds, such as 1 or 0, where 1 represents success and 0 represents failure.

In the method for running the heterogeneous computing system provided in the example, an electronic device may acquire the executable file provided in any of the above examples; run an initialization declaration interface function, an input address interface function, an output address interface function, a static address interface function, and a constant parameter interface function in the executable file, and output a parameter required for running the artificial intelligence processing unit program in the executable file;

run an interface function for acquiring an identifier of the artificial intelligence processing unit program in the executable file according to a parameter in the struct variable acquired by the interface function set, the number and the descriptor of the parameter in the struct variable, and an identifier of an entry function of the artificial intelligence processing unit program, and output an identifier of the artificial intelligence processing unit program; and transfer the identifier of the artificial intelligence processing unit program to the interface function configured to acquire an identifier of the artificial intelligence processing unit program in the executable file, and transfer the artificial intelligence processing unit program to a target artificial intelligence processing unit corresponding to the identifier of the artificial intelligence processing unit according to the identifier of the artificial intelligence processing unit in the interface function for acquiring the identifier of the artificial intelligence processing unit, so as to make the target artificial intelligence processing unit execute the artificial intelligence processing unit program. In the example, when executing an executable file, the electronic device can call a target artificial intelligence processing unit corresponding to an identifier of the artificial intelligence processing unit program to execute the artificial intelligence processing unit program corresponding to the identifier of the artificial intelligence processing unit program according to data required by the artificial intelligence processing unit program in the interface function set composed of multiple interface functions in the executable file, such as a name of the entry function, an input address, the identifier of the artificial intelligence processing unit program, and the identifier of the artificial intelligence processing unit, and the like. Therefore, corresponding functions of the artificial intelligence processing unit written by users may be implemented. In other words, the electronic device allows users to customize new operators according to required functions by using interface functions in the machine learning library, which may solve the problem in the prior art that the method of calling a single operator or a spliced operator in the machine learning library cannot fully implement new functions required by users, and expand the application scope of machine learning library.

Figure 4:
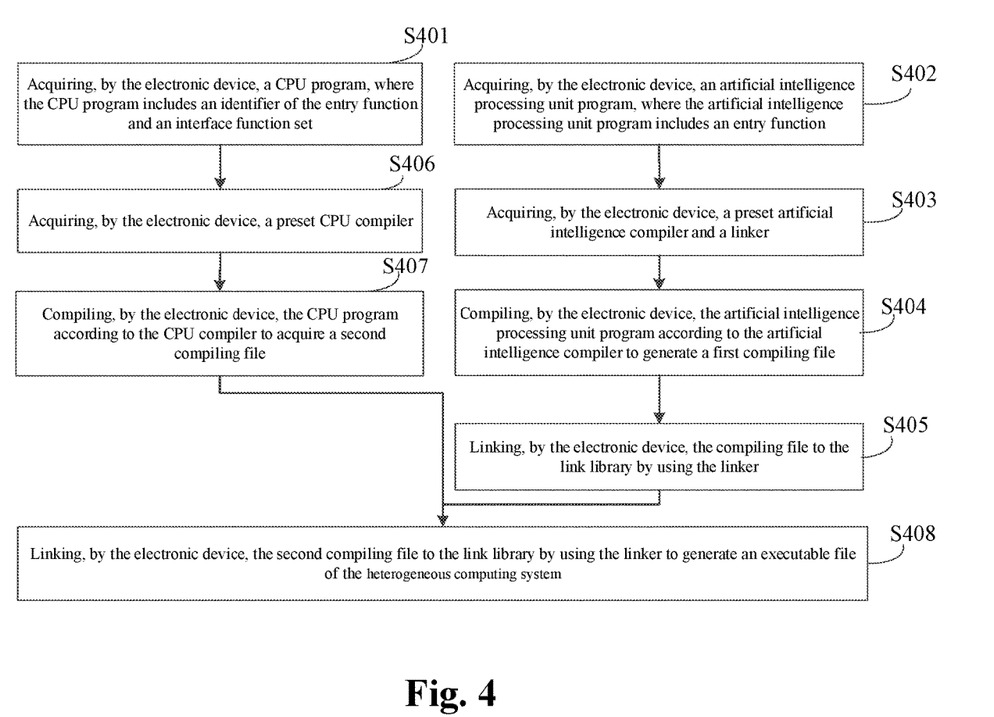
FIG. 4 is a schematic flowchart of a method for acquiring an executable file of a heterogeneous computing system according to another example.

In order to facilitate understanding of those skilled in the art, the method for acquiring an executable file of the heterogeneous computing system provided in the present disclosure is described in detail below. As shown in FIG. 4, the method may include:

in step S401, acquiring, by an electronic device, a CPU program, where the CPU program includes an identifier of the entry function and an interface function set, and executing a step S406 after this step is completed;

in step S402, acquiring, by the electronic device, an artificial intelligence processing unit program, where the artificial intelligence processing unit program includes the entry function;

in step S403, acquiring, by the electronic device, a preset artificial intelligence compiler and a linker;

in step S404, compiling, by the electronic device, the artificial intelligence processing unit program according to the artificial intelligence compiler to generate a first compiling file;

in step S405, linking, by the electronic device, the compiling file to the link library by using the linker, and executing a step S408 after this step is completed;

in step S406, acquiring, by the electronic device, a preset CPU compiler;

in step S407, compiling, by the electronic device, the CPU program according to the CPU compiler to acquire a second compiling file; and in step S408, linking, by the electronic device, the second compiling file to the link library according to the linker to generate an executable file of the heterogeneous computing system.

The working principles and technical effects of the method for acquiring the executable file of the heterogeneous computing system provided in this example are as described in the examples above, and will not be described further herein.

It should be understood that although each step in the flowcharts of FIG. 2 to FIG. 4 are sequentially displayed in an order indicated by arrows, these steps are not necessarily executed in the order indicated by the arrows. Unless explicitly stated otherwise, the execution order of these steps is not strictly limited, and the steps may be performed in other orders. Moreover, at least some of the steps in FIG. 2 to FIG. 4 may include multiple sub-steps or stages, where the multiple sub-steps or stages are not necessarily executed simultaneously or sequentially, but may be executed at different times or executed alternately or by turns with other steps or sub-steps or at least part of stages.

Figure 5:
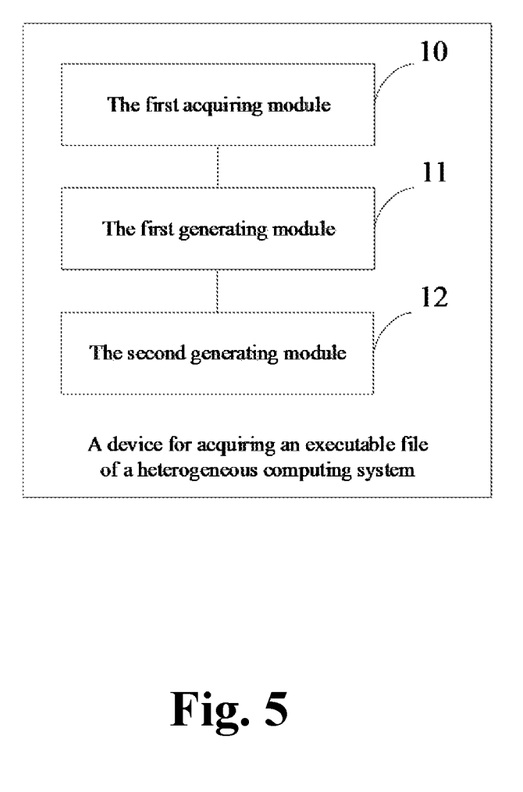
FIG. 5 is a schematic structural diagram of a device for acquiring an executable file of a heterogeneous computing system according to an example.

FIG. 5 is a schematic structural diagram of a device for acquiring an executable file of a heterogeneous computing system according to an example. As shown in FIG. 5, the device may include a first acquiring module 10, a first generating module 11, and a second generating module 12, where the first acquiring module 10 is configured to acquire an artificial intelligence processing unit program and a CPU program, where the artificial intelligence processing unit program includes an entry function, and the CPU program includes an identifier of the entry function and an interface function set;

the first generating module 11 is configured to compile the artificial intelligence processing unit program to generate a first compiling file, and link the first compiling file to a link library of a machine learning library; and the second generating module 12 is configured to compile the CPU program to acquire a second compiling file, and link the second compiling file to the link library to generate an executable file of the heterogeneous computing system.

Optionally, the interface function set is configured to acquire a parameter required for running the artificial intelligence processing unit program.

Optionally, an initialization declaration interface function in the interface function set is configured to declare a struct variable; an input address interface function in the interface function set is configured to acquire an input address in the struct variable; an output address interface function in the interface function set is configured to acquire an output address in the struct variable; a static address interface function in the interface function set is configured to acquire a static address in the struct variable; and a constant parameter interface function in the interface function set is configured to acquire a constant parameter in the struct variable.

In an example, the interface function set is further configured to acquire an identifier of an artificial intelligence processing unit program, where the identifier of the artificial intelligence processing unit program is acquired according to a parameter in the struct variable acquired by the interface function set, a number and a descriptor of the parameter in the struct variable, and the identifier of the entry function of the artificial intelligence processing unit program.

In an example, the interface function set is further configured to acquire an identifier of an artificial intelligence processing unit, so as to make the artificial intelligence processing unit corresponding to the identifier of the artificial intelligence processing unit execute the artificial intelligence processing unit program.

The device for acquiring the executable file of the heterogeneous computing system provided in the example may perform the above examples of method. The implementation principles and technical effects thereof are similar, and will not be described further herein.

In a device for acquiring an executable file of a heterogeneous computing system provided in another example, based on the examples shown in FIG. 5, optionally, the first generating module 12 may include a first acquiring unit, a first compiling unit, and a first linking unit, where the first acquiring unit is configured to acquire a preset artificial intelligence compiler and a preset linker;

the first compiling unit is configured to compile the artificial intelligence processing unit program according to the artificial intelligence compiler to generate a first compiling file; and the first linking unit is configured to link the compiling file to the linked library by using the linker.

The device for acquiring the executable file of the heterogeneous computing system provided in the example may perform the above examples of method. The implementation principles and technical effects thereof are similar, and will not be described further herein.

In a device for acquiring an executable file of a heterogeneous computing system provided in another example, based on the above examples, optionally, the second generating module 13 may include a second acquiring unit, a second compiling unit, and a second linking unit, where the second acquiring unit is configured to acquire a preset CPU compiler;

the second compiling unit is configured to compile the CPU program according to the CPU compiler to acquire a second compiling file; and the second linking unit is configured to link the second compiling file to the linked library by using the linker to generate an executable file of the heterogeneous computing system.

The device for acquiring the executable file of the heterogeneous computing system provided in the example may perform the above examples of method. The implementation principles and technical effects thereof are similar, and will not be described further herein.

Figure 6:
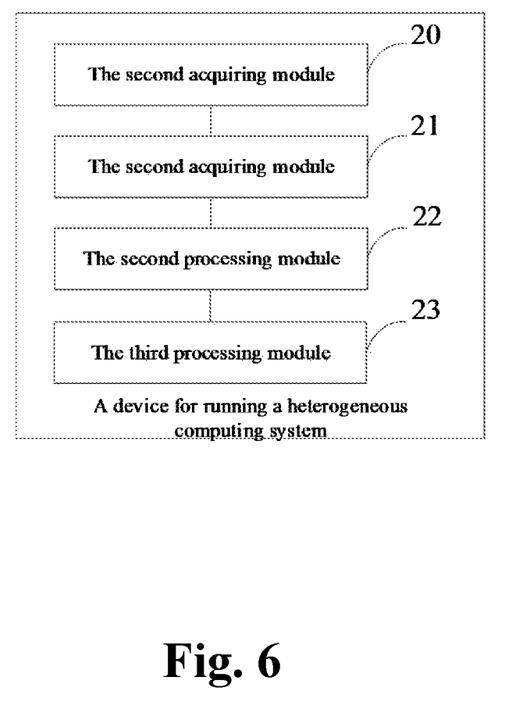
FIG. 6 is a schematic structural diagram of a device for running a heterogeneous computing system according to an example.

FIG. 6 is a schematic structural diagram of a device for running a heterogeneous computing system according to an example. As shown in FIG. 6, the device may include: a second acquiring module 20, a first processing module 21, a second processing module 22, and a third processing module 23, where the second acquiring module 20 is configured to acquire the executable file described in any of the above examples;

the first processing module 21 is configured to run an initialization declaration interface function, an input address interface function, an output address interface function, a static address interface function, and a constant parameter interface function in the executable file, and output a parameter required for running the artificial intelligence processing unit program in the executable file;

the second processing module 22 is configured to run an interface function for acquiring an identifier of the artificial intelligence processing unit program in the executable file according to a parameter in the struct variable acquired by the interface function set, the number and the descriptor of the parameter in the struct variable, and an identifier of an entry function of the artificial intelligence processing unit program, and output an identifier of the artificial intelligence processing unit program; and the third processing module 23 is configured to transfer the identifier of the artificial intelligence processing unit program to the interface function configured to acquire an identifier of the artificial intelligence processing unit program in the executable file, and transfer the artificial intelligence processing unit program to a target artificial intelligence processing unit corresponding to the identifier of the artificial intelligence processing unit according to the identifier of the artificial intelligence processing unit in the interface function for acquiring the identifier of the artificial intelligence processing unit, so as to make the target artificial intelligence processing unit execute the artificial intelligence processing unit program.

The device for acquiring the executable file of the heterogeneous computing system provided in the example may perform the above examples of method. The implementation principles and technical effects thereof are similar, and will not be described further herein.

In an example, a CPU is provided, where the CPU and an artificial intelligence processing unit constitute a heterogeneous computing system, and the CPU is configured to implement following steps:

acquiring an artificial intelligence processing unit program and a CPU program, where the artificial intelligence processing unit program includes an entry function, and the CPU program includes an identifier of the entry function and an interface function set;

compiling the artificial intelligence processing unit program to generate a first compiling file, and linking the first compiling file to a link library of a machine learning library; and compiling the CPU program to acquire a second compiling file, and linking the second compiling file to the link library to generate an executable file of the heterogeneous computing system.

The CPU is further configured to implement the following steps:

acquiring an executable file described in any of the above examples;

running an initialization declaration interface function, an input address interface function, an output address interface function, a static address interface function, and a constant parameter interface function in the executable file, and outputting a parameter required for running the artificial intelligence processing unit program in the executable file;

running an interface function for acquiring an identifier of the artificial intelligence processing unit program in the executable file according to a parameter in the struct variable acquired by the interface function set, the number and the descriptor of the parameter in the struct variable, and an identifier of an entry function of the artificial intelligence processing unit program, and outputting an identifier of the artificial intelligence processing unit program; and transferring the identifier of the artificial intelligence processing unit program to the interface function configured to acquire an identifier of the artificial intelligence processing unit program in the executable file, and transferring the artificial intelligence processing unit program to a target artificial intelligence processing unit corresponding to the identifier of the artificial intelligence processing unit according to the identifier of the artificial intelligence processing unit in the interface function for acquiring the identifier of the artificial intelligence processing unit, so as to make the target artificial intelligence processing unit execute the artificial intelligence processing unit program.

Figure 7:
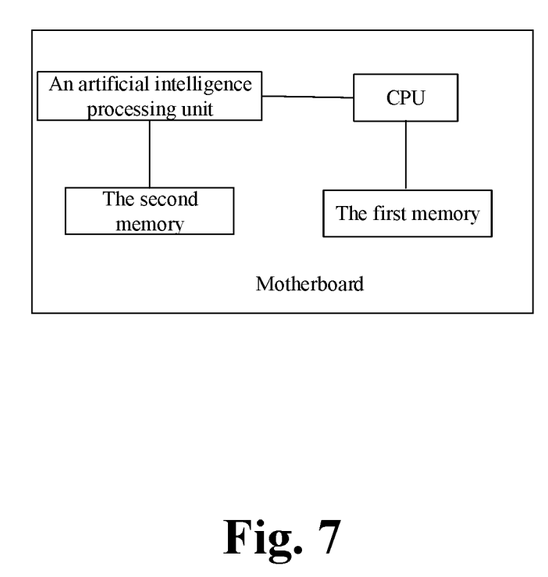
FIG. 7 is a schematic structural diagram of a motherboard according to an example.

FIG. 7 is a schematic structural diagram of a motherboard according to an example. The motherboard is applied to a heterogeneous computing system, and may include: the CPU described in the above example, a first memory connected to the CPU, an artificial intelligence processing unit, and a second memory connected to the artificial intelligence processing unit, where the first memory is configured to store a CPU program and an artificial intelligence processing unit program, the second memory is configured to store input data and output data required by the artificial intelligence processing unit, and the artificial intelligence processing unit is configured to execute the artificial intelligence processing unit program.

In an example, an electronic device is provided, where the electronic device is applied to a heterogeneous computing system, and may include a motherboard.

It may be understood by those of ordinary skill in the art that all or a part of the various methods of the examples described above may be accomplished by means of an electronic device program to instruct hardware, where the electronic device program may be stored in a nonvolatile electronic device readable storage medium, and may include steps in the above examples of method during execution. Any references to a memory, storage, data base, or other medium used in the examples provided in the present disclosure may include a nonvolatile memory and/or a volatile memory. The nonvolatile memory may include a ROM (Read Only Memory), a PROM (Programmable ROM), an EPROM (Electrically PROM), an EEPROM (Electrically Erasable PROM), or a flash memory. The volatile memory may include a RAM (Random Access Memory) or an external caching memory. By way of illustration, and rather than limitation, RAM may be obtained in various forms, such as a SRAM (Static RAM), a DRAM (Dynamic RAM), a SDRAM (Synchronous DRAM), a DDRSDRAM (Double Data Rate SDRAM), an ESDRAM (Enhanced SDRAM), a SLDRAM (Synchlink DRAM), RDRAM (Rambus Direct RAM), a DRDRAM (Direct Rambus Dynamic RAM), and a RDRAM (Rambus Dynamic RAM).

The technical features of the above examples may be arbitrarily combined. For the sake of brevity of description, not all possible combinations of the technical features in the above examples are described. However, as long as there is no contradiction between the combinations of these technical features, the combinations should be considered as within the scope of the present disclosure.

The examples descried above are only several implementations of the present disclosure. Although the description is relatively specific and detailed, yet it shall not be considered as limitation of the scope of the present disclosure. It should be noted that, those of ordinary skill in the art can make various changes and improvements without departing from the spirit of the present disclosure, which shall fall within the protection scope of the present disclosure. Therefore, the protection scope of the present disclosure shall be subject to the protection scope defined by the claims.

What is claimed is:

1. A method for acquiring an executable file of a heterogeneous computing system, wherein the heterogeneous computing system comprises a general-purpose central processing unit (CPU) and an artificial intelligence processing unit, and the method comprises:

acquiring an artificial intelligence processing unit program for the artificial intelligence processing unit, written in accordance with a neural network programming language and a CPU program for the CPU, wherein the artificial intelligence processing unit program comprises an entry function, and the CPU program comprises an identifier of the entry function and an interface function set,
  wherein the interface function set is configured to acquire a parameter required for running the artificial intelligence processing unit program,
  wherein the interface function set configured to acquire the parameter required for running the artificial intelligence processing unit program includes:
    an initialization declaration interface function in the interface function set configured to declare a struct variable,
    an input address interface function in the interface function set configured to acquire an input address in the struct variable,
    an output address interface function in the interface function set configured to acquire an output address in the struct variable,
    a static address interface function in the interface function set configured to acquire a static address in the struct variable, and
    a constant parameter interface function in the interface function set configured to acquire a constant parameter in the struct variable,
  wherein the interface function set is further configured to acquire an identifier of the artificial intelligence processing unit program, wherein the identifier of the artificial intelligence processing unit program is acquired according to a parameter in the struct variable acquired by the interface function set, a number and a descriptor of the parameter in the struct variable acquired by the interface function set, and the identifier of the entry function of the artificial intelligence processing unit program;
compiling the artificial intelligence processing unit program to acquire a first compiling file, and linking the first compiling file to a link library of a machine learning library; and
compiling the CPU program to acquire a second compiling file, and linking the second compiling file to the link library to generate the executable file of the heterogeneous computing system.

2. The method of claim 1, wherein the interface function set is further configured to acquire an identifier of the artificial intelligence processing unit, so as to make the artificial intelligence processing unit corresponding to the identifier of the artificial intelligence processing unit execute the artificial intelligence processing unit program.

3. The method of claim 1, wherein the compiling the artificial intelligence processing unit program to generate the first compiling file, and linking the first compiling file to the link library of the machine learning library includes:
acquiring a preset artificial intelligence compiler and a linker,
compiling the artificial intelligence processing unit program according to the artificial intelligence compiler to generate the first compiling file, and
linking, by the linker, the first compiling file to the link library.

4. The method of claim 3, wherein the compiling the CPU program to acquire the second compiling file, and linking the second compiling file to the link library to generate the executable file of the heterogeneous computing system includes:
  acquiring a preset CPU compiler,
  compiling the CPU program according to the CPU compiler to acquire the second compiling file, and
  linking, by the linker, the second compiling file to the link library to generate the executable file of the heterogeneous computing system.

5. A method for running a heterogeneous computing system, comprising:
  acquiring an executable file;
  running an initialization declaration interface function, an input address interface function, an output address interface function, a static address interface function, and a constant parameter interface function in the executable file, and outputting a parameter required for running an artificial intelligence processing unit program written in accordance with a neural network programming language in the executable file;
  running a first interface function for acquiring that acquires an identifier of the artificial intelligence processing unit program in the executable file according to a parameter in a struct variable acquired by an interface function set that includes multiple interface functions, the number and the descriptor of the parameter in the struct variable acquired by the interface function set, and an identifier of an entry function of the artificial intelligence processing unit program, and outputting the identifier of the artificial intelligence processing unit program; and
  providing the identifier of the artificial intelligence processing unit program to the first interface function configured to acquire the identifier of the artificial intelligence processing unit program in the executable file, and transferring the artificial intelligence processing unit program to a target artificial intelligence processing unit corresponding to an identifier of the artificial intelligence processing unit according to the identifier of the artificial intelligence processing unit program in the first interface function for acquiring the identifier of the artificial intelligence processing unit, so as to make the target artificial intelligence processing unit execute the artificial intelligence processing unit program.

6. An electronic device for acquiring an executable file of a heterogeneous computing system, wherein the heterogeneous computing system comprises a general-purpose central processing unit (CPU) and an artificial intelligence processing unit, and the device comprises:
  a hardware memory;
  an acquiring program configured to acquire an artificial intelligence processing unit program for the artificial intelligence processing unit, written in accordance with a neural network programming language and a CPU program for the CPU, wherein the artificial intelligence processing unit program comprises an entry function, and the CPU program comprises an identifier of the entry function and an interface function set,
    wherein the interface function set is configured to acquire a parameter required for running the artificial intelligence processing unit program,
    wherein the interface function set configured to acquire the parameter required for running the artificial intelligence processing unit program includes:
      an initialization declaration interface function in the interface function set configured to declare a struct variable,
      an input address interface function in the interface function set configured to acquire an input address in the struct variable,
      an output address interface function in the interface function set configured to acquire an output address in the struct variable,
      a static address interface function in the interface function set configured to acquire a static address in the struct variable, and
      a constant parameter interface function in the interface function set configured to acquire a constant parameter in the struct variable,
    wherein the interface function set is further configured to acquire an identifier of the artificial intelligence processing unit program, wherein the identifier of the artificial intelligence processing unit program is acquired according to a parameter in the struct variable acquired by the interface function set, a number and a descriptor of the parameter in the struct variable acquired by the interface function set, and the identifier of the entry function of the artificial intelligence processing unit program;
  a first compiler configured to compile the artificial intelligence processing unit program to generate a first compiling file, and link the first compiling file to a link library of a machine learning library; and
  a second compiler configured to compile the CPU program to acquire a second compiling file, and link the second compiling file to the link library to generate the executable file of the heterogeneous computing system.

7. The device of claim 6, wherein the interface function set is further configured to acquire an identifier of the artificial intelligence processing unit, so as to make the artificial intelligence processing unit corresponding to the identifier of the artificial intelligence processing unit execute the artificial intelligence processing unit program.

8. The device of claim 6, wherein the first compiler includes:
  a first acquiring unit configured to acquire a preset artificial intelligence compiler and a linker,
  a first generating unit configured to compile the artificial intelligence processing unit program according to the artificial intelligence compiler to generate a first compiling file, and
  a first linking unit configured to link the compiling file to the link library by using the linker.

9. The device of claim 8, wherein the second compiler includes: a second acquiring unit configured to acquire a preset CPU compiler, a second generating unit configured to compile the CPU program according to the CPU compiler to acquire a second compiling file, and a second linking unit configured to link the second compiling file to the link library to generate the executable file of the heterogeneous computing system.

* * * * *